United States Patent
Almgren et al.

(10) Patent No.: US 8,918,048 B2
(45) Date of Patent: Dec. 23, 2014

(54) PARTIAL RELAYING OF MESSAGE BASED ON INTERFERENCE IN WIRELESS NETWORK

(75) Inventors: Magnus Almgren, Sollentuna (SE); Pinghua Huang, Stockholm (SE)

(73) Assignee: Optis Cellular Technology, LLC, Plano, TX (US)

( * ) Notice: Subject to any disclaimer, the term of this patent is extended or adjusted under 35 U.S.C. 154(b) by 264 days.

(21) Appl. No.: 13/580,999

(22) PCT Filed: Mar. 23, 2010

(86) PCT No.: PCT/SE2010/050318
§ 371 (c)(1), (2), (4) Date: Aug. 24, 2012

(87) PCT Pub. No.: WO2011/119077
PCT Pub. Date: Sep. 29, 2011

(65) Prior Publication Data
US 2013/0005239 A1  Jan. 3, 2013

(51) Int. Cl.
*H04B 7/15* (2006.01)
(Continued)

(52) U.S. Cl.
CPC ........ *H04B 7/15592* (2013.01); *H04B 7/15564* (2013.01); *H04B 7/2606* (2013.01); *H04W 40/22* (2013.01); *H04L 2001/0097* (2013.01); *H04W 28/04* (2013.01); *H04W 84/047* (2013.01)
USPC ............................ 455/11.1; 455/13.1; 455/16

(58) Field of Classification Search
CPC ........... H04B 7/15592; H04B 7/15564; H04B 7/2606; H04W 40/22; H04W 28/04; H04W 84/047; H04L 2001/0097
USPC ................ 455/3.02, 427, 428, 430, 431, 7–9, 455/11.1, 12.1, 13.1, 13.2, 14–17; 370/226, 370/293, 246, 274, 279, 315, 316, 492, 401
See application file for complete search history.

(56) References Cited

U.S. PATENT DOCUMENTS

2002/0039383 A1* 4/2002 Zhu et al. ..................... 375/214
2003/0223354 A1 12/2003 Olszewski
(Continued)

FOREIGN PATENT DOCUMENTS

EP          2541783 A1    1/2013
WO      2004102891 A1   11/2004
(Continued)

OTHER PUBLICATIONS

Khormuji, et al. "Cooperative Transmission Based on Decode-and-Forward Relaying with Partial Repetition Coding," IEEE Transactions on Wireless Communications, Apr. 2009, pp. 1716-1725, vol. 8, No. 4.
(Continued)

*Primary Examiner* — Dominic E Rego
(74) *Attorney, Agent, or Firm* — Vincent J. Allen; Carstens & Cahoon, LLP

(57) ABSTRACT

In the context of a wireless communication network, relay-based communication is provided. In particular, a relay node (100) comprises a receiver (110) configured to receive a signal representative of a message transmitted from an originating node and intended for a destination node, wherein a transmission from an interference source causes interference in the received first signal. The relay node (100) also comprises an interference detector (130) configured to detect interference from the interference source in the received signal and which part of the message that is affected by the interference, called the interfered part of the message, and a forwarding unit (120) configured to perform a partial retransmission based on the interfered part of the message to the destination node.

14 Claims, 13 Drawing Sheets

(51) Int. Cl.
- *H04B 7/155* (2006.01)
- *H04W 28/04* (2009.01)
- *H04B 7/26* (2006.01)
- *H04W 40/22* (2009.01)
- *H04L 1/00* (2006.01)
- *H04W 84/04* (2009.01)

(56) References Cited

U.S. PATENT DOCUMENTS

| | | | |
|---|---|---|---|
| 2004/0242154 A1* | 12/2004 | Takeda et al. | 455/16 |
| 2006/0229017 A1* | 10/2006 | Larsson et al. | 455/63.1 |
| 2007/0129008 A1 | 6/2007 | Shi et al. | |
| 2008/0185521 A1* | 8/2008 | Hollingsworth | 250/338.1 |
| 2009/0186645 A1* | 7/2009 | Jaturong et al. | 455/507 |
| 2009/0290516 A1* | 11/2009 | Han et al. | 370/277 |
| 2010/0027458 A1* | 2/2010 | Wu et al. | 370/315 |
| 2010/0291865 A1* | 11/2010 | Gore et al. | 455/7 |
| 2011/0134772 A1* | 6/2011 | Zhang et al. | 370/252 |
| 2012/0058719 A1* | 3/2012 | Gan et al. | 455/10 |

FOREIGN PATENT DOCUMENTS

| | | |
|---|---|---|
| WO | 2007064249 A1 | 6/2007 |
| WO | 2008108708 A1 | 9/2008 |

OTHER PUBLICATIONS

Souyal, Michael et al, "Performance of Amplify-And-Forward and Decode-And-Forward Relaying in Rayleigh Fading With Turbo Codes", 2006 IEEE International Conference on Acoustics, Speech and Signal Processing, May 2006, pp. IV-681-IV 684, Toulouse, France.

Thejawsi, Chandrashekhar et al. "Rate-Achievability Strategies for Two-Hop Interference Flows," 2008 Allerton Conference on Communication, Control, and Computing, Sep. 2008, pp. 1432-1439, Illinois, USA.

Jing, Jinhua et al. "Achievable Rates and Capacity for Gaussian Relay Channels with Correlated Noises," ISIT 2009, Jul. 2009, pp. 179-183, Seoul, Korea.

Chu, Josephine et al. "Optimization for Fractional Cooperation in Multiple-Source Multiple-Relay Systems," IEEE ICC 2009. Jun. 2009, Dresden, Germany.

Moon, Jang-Wook et al, "Collaborative mitigation of partial-time jamming on nonfading channels", IEEE Transactions on Wireless Communication, vol. 5, Issue 6, Jun. 2006, pp. 1371-1381.

Han, Myeongsu et al, "Cooperative diversity performance for OFDM transmission over partially jammed channels", AEU International Journal of Electronics and Communications vol. 62, Issue 6, Jun. 2, 2008, pp. 464-471.

\* cited by examiner

PARTIAL RELAYING OF MESSAGE BASED ON INTERFERENCE IN WIRELESS NETWORK

TECHNICAL FIELD

The present invention generally relates to communication based on relaying in a wireless communication network.

BACKGROUND

In addition to an originating source node and a destination node, relaying generally involves a relay or relay node, and is therefore sometimes also referred to as relay-based communication. A classical wireless relay setup basically involves an originating source node (S) 50, a relay (R) 100, and a destination (D) 200, as schematically illustrated in FIG. 1.

In a first time phase, the originating source S transmits a message intended for the destination D, as illustrated in FIG. 1. This message transmission is also picked up by the intermediate relay R. In the next time phase, the relay R may re-transmit the received message to the destination D, as illustrated in FIG. 2.

Various relay communication schemes may be employed, e.g. a half-duplex Hybrid Amplify-and-Forward/Decode-and-Forward (hybrid AF/DF) relaying scheme may be used. In such an exemplary hybrid AF/DF protocol, the relay R detects whether it successfully receives a message from the source S, e.g. using a Cyclic Redundancy Checksum (CRC). If successful, the relay R re-encodes and transmits the message to the destination node D as in the DF protocol. If the transmission by the source S is not correctly decoded, the relay R amplifies and forwards the message as in the AF protocol [1]. The relay R is thus used as an intermediate node to assist the overall message transmission from source S to destination D.

As illustrated in FIG. 1, an interference source (I) may cause partial-time interference or partial-band interference during the first transmission. This may happen when the interference source I has a shorter transmission than the transmission from the source S, or when the interference source I acts as a "jammer" with partial-time or partial-band jamming. It is here assumed that the interference occurs in the first time phase.

Collaborative reception techniques for use in the presence of partial-time interference caused by partial-time jamming are proposed in reference [2]. Under the proposed techniques, a group of radios acts as a distributed antenna array by exchanging information that is then used to perform jamming mitigation.

An interference mitigation technique under partial-band interference caused by partial-band jamming (PBJ), called relay-based sub-band shifting method, is proposed in reference [3]. Through this approach, each sub-band of the amplified OFDM symbol at the relay can be changed by the pre-defined shifting rule of each relay, and the jamming effects at the destination may be partially removed.

A traditional way of R assisting the overall message transmission is that R decodes-and-forwards, or amplifies-and-forwards the information received from S. The disadvantage of this scheme is low spectral efficiency.

Another traditional way of R assisting the overall message transmission is that R waits for suitable feedback from the destination D and then sends what D needs. The disadvantage of this scheme is long delay.

The techniques proposed in [2] require a group of radios to act as a distributed antenna array by exchanging information that is then used to perform interference mitigation. The complexity is high. In addition, it is oriented to mitigate only partial-time interference.

The technique proposed in [3] also requires multiple terminals to share their resources to form a virtual antenna array, which increases the complexity.

Reference [4] relates to multi-user diversity scheduling in a wireless relaying network based on channel quality feedback from the receiving destination nodes.

Reference [5] relates to interference cancellation at the receiving end in a wireless relaying network.

SUMMARY

It is a general object to improve relay-based communication in a wireless communication network.

It is a specific object to provide a method for communication based on relaying in a wireless communication network.

It is another specific object to provide a relay node configured for operation in a wireless communication network.

It is also a specific object to provide a communication system comprising such a relay node.

Yet another object is to provide a destination node configured for operation in a wireless communication network.

These and other objects are met by embodiments as defined by the accompanying patent claims.

In the context of a wireless communication network comprising a designated originating node, a relay node and a destination node, the following exemplary method is provided according to a first aspect:

The originating node transmits a message intended for the destination node.

The relay node receives a first signal representative of the message transmitted from the originating node, wherein a transmission from an interference source causes interference in the received first signal.

The destination node receives a second signal representative of the message transmitted from the originating node, wherein the transmission from the interference source causes interference also in the received second signal.

The relay node detects interference from the interference source in the received first signal and which part of the message that is affected by the interference, called the interfered part of the message. The relay node then performs a partial retransmission based on the interfered part of the message.

The destination node receives a third signal representative of the interfered part of the message transmitted from the relay node, and detects at least part of the message based on the received second signal representative of the message transmitted from said originating node and the received third signal representative of the interfered part of the message transmitted from the relay node.

In this way, spectral efficiency can be improved and delay can be minimized with low complexity.

According to a second aspect there is provided a relay node configured for operation in a wireless communication network. The relay node comprises a receiver configured to receive a signal representative of a message transmitted from an originating node and intended for a destination node, wherein a transmission from an interference source causes interference in the received first signal. The relay node also comprises an interference detector configured to detect interference from the interference source in the received signal and which part of the message that is affected by the interference, called the interfered part of the message, and a forwarding unit configured to perform a partial retransmission based on the interfered part of the message to the destination node.

The relay node supports efficient relaying in the wireless communication network.

There is provided a communication system comprising such a relay node.

According to a third aspect there is provided a destination node configured for operation in a wireless communication network. The destination node comprises a receiver configured to receive a signal representative of a message from an originating node, wherein a transmission from an interference source causes interference in the received signal. The receiver is also configured to receive a signal representative of an interfered part of the message from a relay node. The destination node also comprises a signal detector configured to detect at least part of the message based on combining a representation of the received signal from the originating node and a representation of the received signal from the relay node.

Other advantages offered by the invention will be appreciated when reading the below description of embodiments of the invention.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

Figure 2:
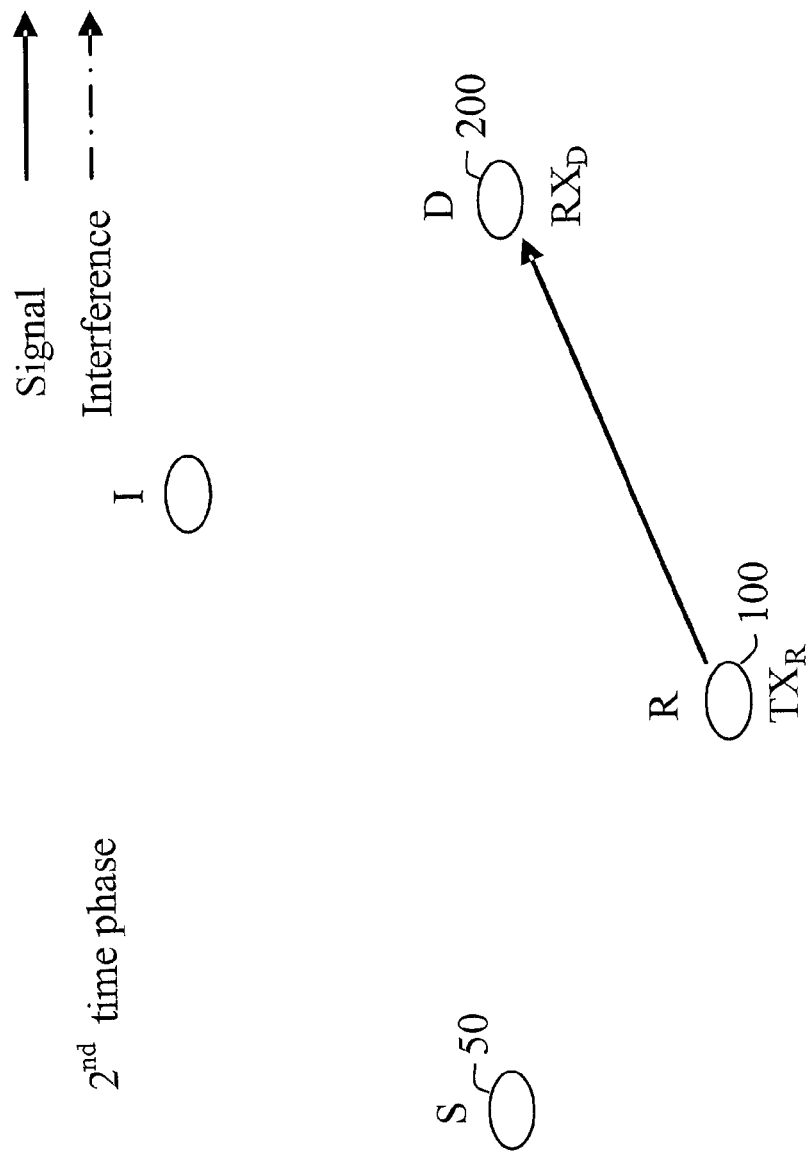
FIG. 2 is a schematic diagram illustrating a wireless relay setup in a second time phase.
Figure 3:
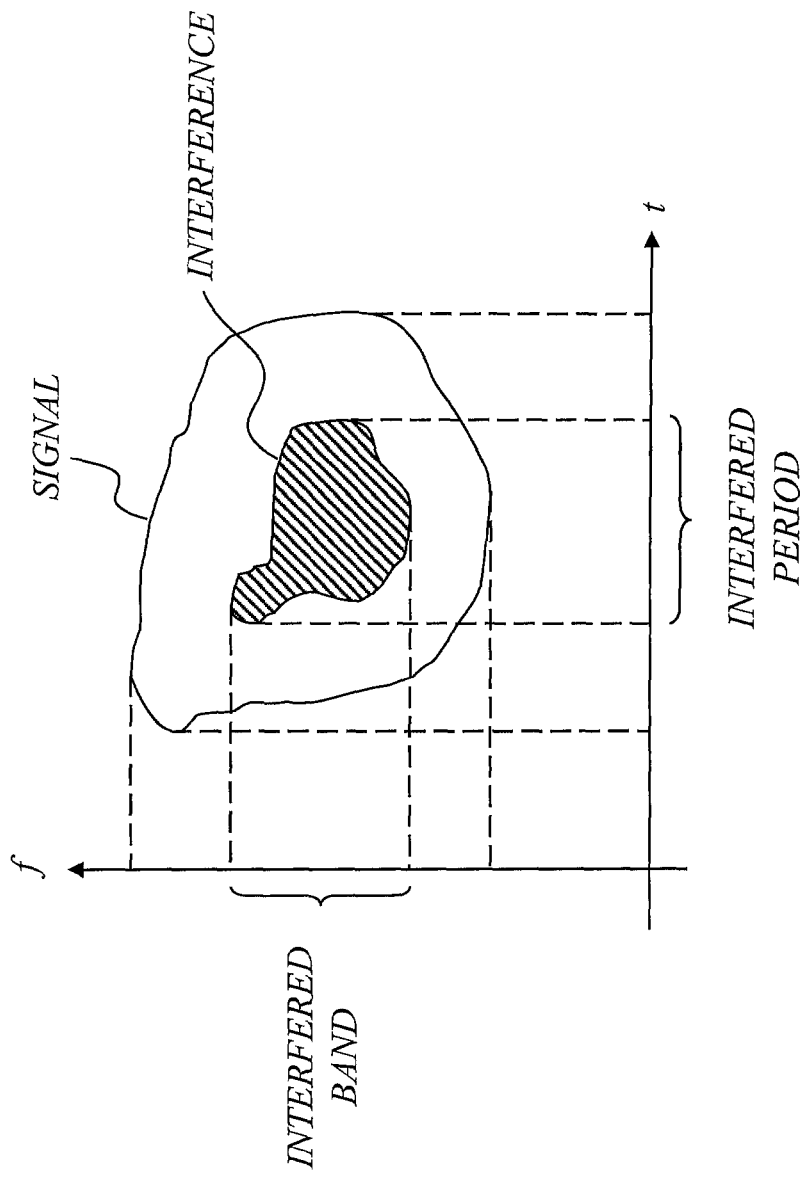
FIG. 3 is a schematic diagram illustrating an example of time-frequency resources assigned for transmission over a wireless medium together with a representation of interference affecting these resources.

It may be useful to begin with a brief overview of relay-based communication under the influence of interference, with reference once again to FIGS. 1 and 2, and also FIG. 3.

Figure 1:
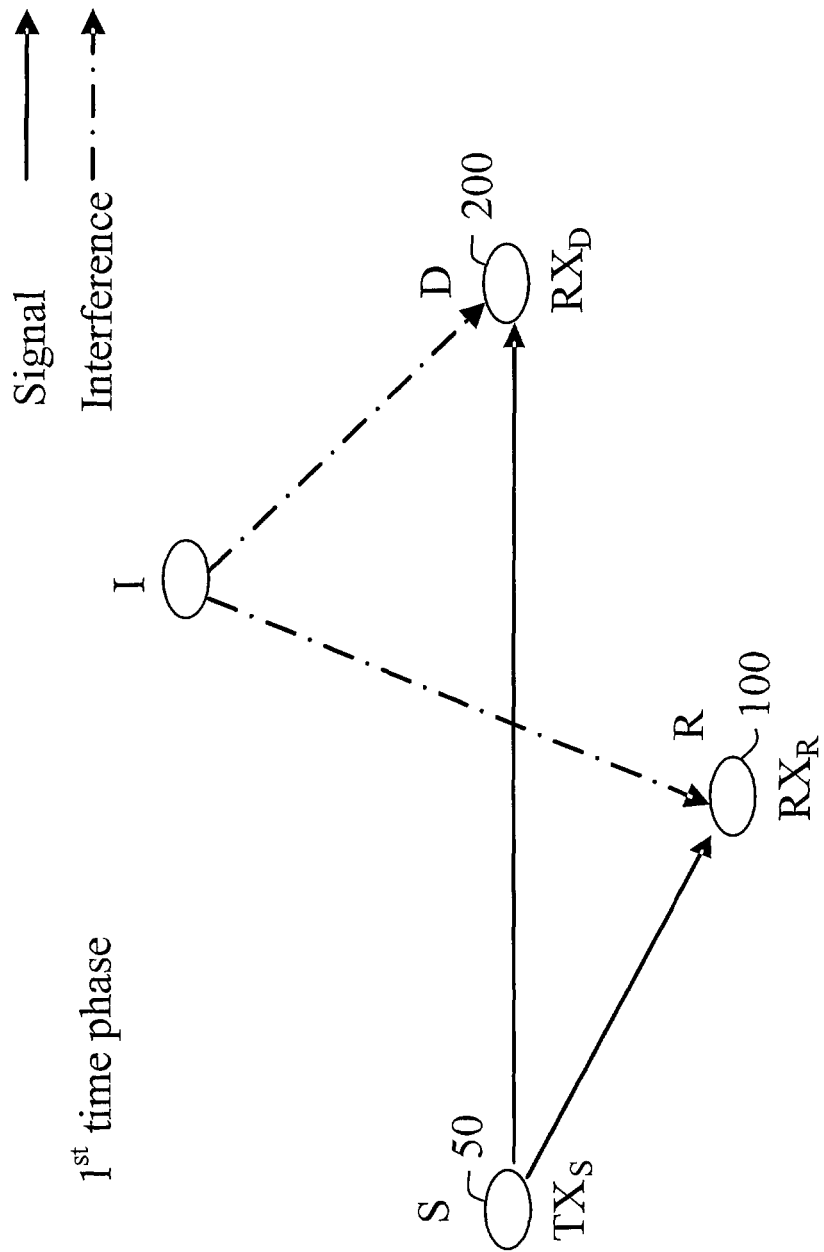
FIG. 1 is a schematic diagram illustrating a wireless relay setup in a first time phase.

As illustrated in FIG. 1, the originating source node S transmits a message intended for the destination D in a first time phase. The transmission is received by the destination node D, but also by the intermediate relay node R.

An interference source (I) may cause partial-time interference or partial-band interference during the first transmission.

FIG. 3 is a schematic diagram illustrating an example of time-frequency resources assigned for transmission over a wireless medium together with a representation of interference affecting these resources. In general, a set of resources assigned for a particular transmission of a signal over the wireless medium may be represented in time and frequency as illustrated in FIG. 3. An interfering transmission by an interference source may lead to interference in both time and frequency, as represented by the dashed area in FIG. 3.

In the frequency domain, the interference corresponds to an interfered band, and in the time domain the interference corresponds to an interfered period of time. These situations are referred to as partial-time interference and partial-band interference, respectively.

As illustrated in FIG. 2, the relay R may re-transmit the information received in the first time phase to the destination D in the second time phase so that the destination node D may combine the information received from the source node in the first time phase and the information received from the relay node in the second time phase. This will typically increase the chances of successful decoding of the message at the destination node.

Traditionally, R decodes-and-forwards, or amplifies-and-forwards the information received from S. The disadvantage of this scheme is low spectral efficiency. In another traditional approach R waits for suitable feedback from the destination D and then sends what D needs. The disadvantage of this scheme is long delay. Other more complex solutions have also been proposed in the prior art.

Figure 4:
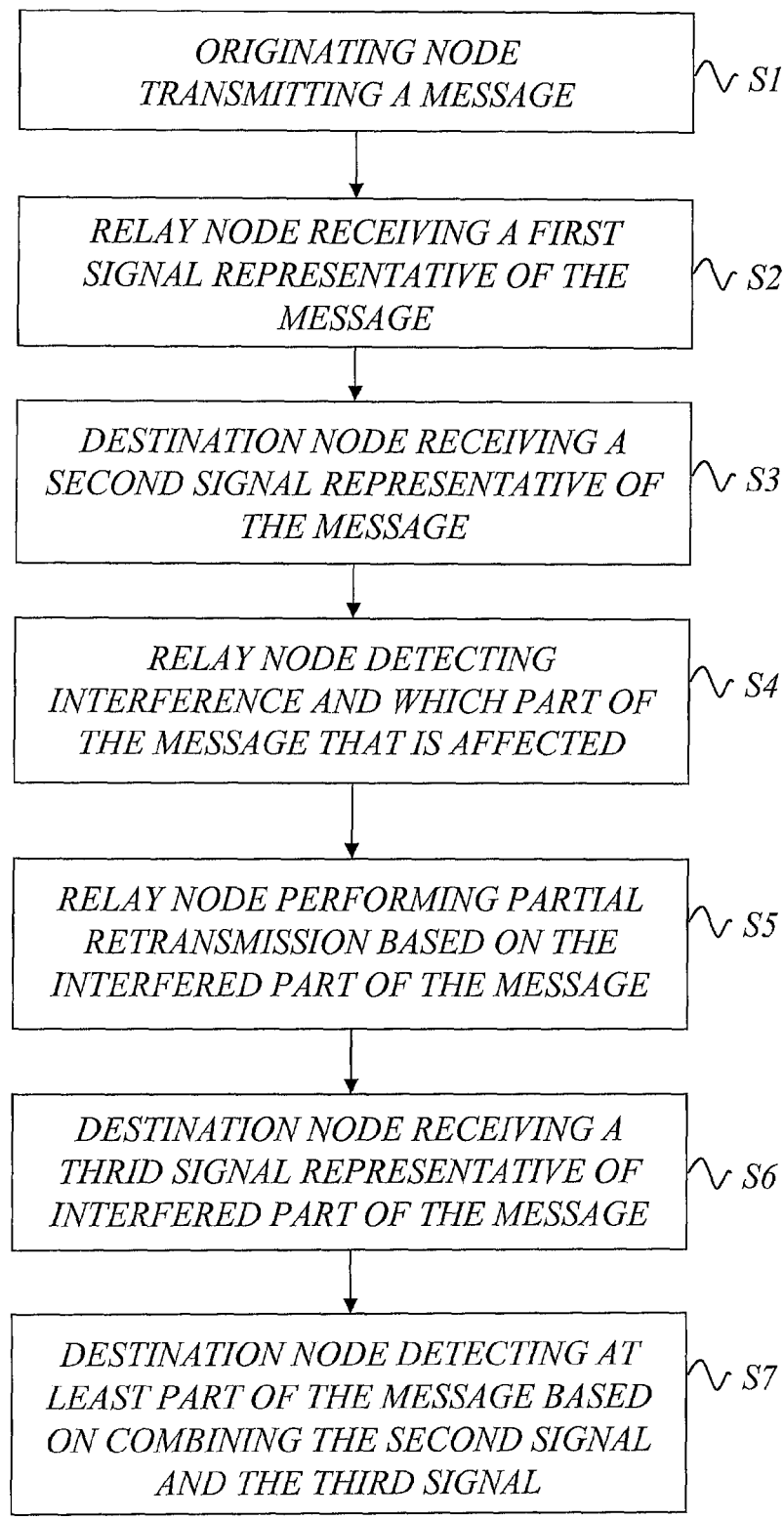
FIG. 4 is a schematic flow diagram illustrating an example of a method for communication based on relaying in a wireless communication network according to an embodiment.

In the context of a wireless communication network comprising a designated originating node, a relay node and a destination node, an exemplary method for communication based on relaying will now be described with reference to the flow diagram of FIG. 4.

In step S1, the originating node transmits a message intended for the destination node.

In step S2, the relay node receives a first signal representative of the message transmitted from the originating node, wherein a transmission from an interference source causes interference in the received first signal.

In step S3, the destination node receives a second signal representative of the message transmitted from the originating node, wherein the transmission from the interference source causes interference also in the received second signal.

It should be noted that the radio propagation channel to the relay node and the radio propagation channel to the destination node affect the transmitted signal differently, and therefore the first signal received at the relay node generally differs from the second signal received at the destination node. The notations "first" and "second" with respect to the received signals are not intended to indicate that the signals are received in a particular time sequence. The received signals are representative of the message transmitted in one and the same transmission from the originating node in the first time phase (see FIG. 1).

In step S4, the relay node detects interference from the interference source in the received first signal and which part of the message that is affected by the interference, called the interfered part of the message.

In step S5, the relay node then performs a partial retransmission based on the interfered part of the message.

In step S6, the destination node receives a third signal representative of the interfered part of the message transmitted from the relay node.

The third signal is received during the second time phase (see FIG. 2).

In step S7, the destination node detects at least part of the message (the whole message if possible) based on the received second signal representative of the message transmitted from said originating node and the received third signal representative of the interfered part of the message transmitted from the relay node.

In this way, spectral efficiency can be improved and delay can be minimized with low complexity.

The detection of interference and which part of the message that is affected by the interference may be performed in the time domain and/or the frequency domain.

In an exemplary embodiment, the detection of interference and which part of the message that is affected by the interference is based on Signal-to-Interference Ratio (SIR) or Signal-to-Interference-plus-Noise Ratio (SINR) measurements. For example, reference [6] describes to a SINR measurement method for OFDM communication systems.

In another exemplary embodiment, the detection of interference and which part of the message that is affected by the interference is based on evaluating soft values, where each soft value represents the reliability of a received bit of information, as will be explained in more detail later on.

The partial retransmission may for example be based on Amplify-and-Forward (AF) or Decode-and-Forward (DF) relaying.

Figure 5:
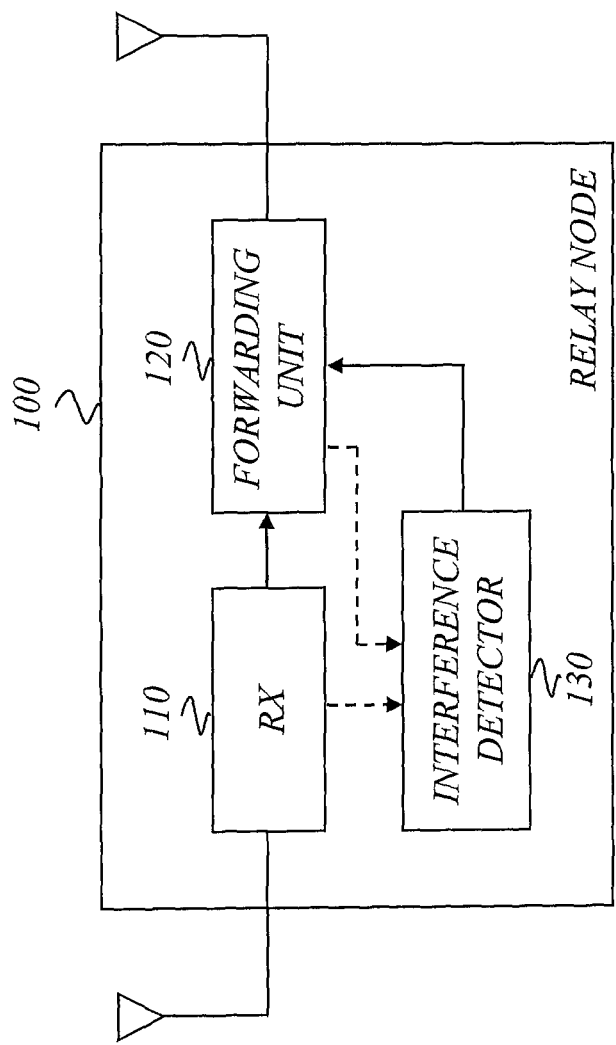
FIG. 5 is a schematic block diagram illustrating an example of a relay node according to an embodiment.

FIG. 5 is a schematic block diagram illustrating an example of a relay node according to an embodiment. The relay node 100 is configured for operation in a wireless communication network. Basically, the relay node 100 comprises a receiver 110, a forwarding unit 120, and an interference detector 140. Some of the functionalities of the forwarding unit 120 may be regarded as part of the overall receiver chain, whereas other functionalities of the forwarding unit may be regarded as part of the overall transmitter chain.

The receiver 110 is configured to receive a signal representative of a message transmitted from the originating node and intended for the destination node, wherein a transmission from an interference source causes interference in the received first signal. The interference detector 130 is configured to detect interference from the interference source in the received signal and which part of the message that is affected by the interference, called the interfered part of the message. The forwarding unit 120 is configured to perform a partial retransmission based on the interfered part of the message to the destination node.

Preferably, the interference detector 130 is configured to detect interference and which part of said message that is affected by the interference in the time domain and/or the frequency domain.

The interference detector 130 may be implemented in different ways. For example, the interference detector may analyze the received signal from the receiver 110, or it may analyze soft values or some other representation of the received signal from the demodulator and/or decoder, which may be situated in the receiver 110 or in the forwarding unit 120 depending on the implementation of the relay node 100.

In an exemplary embodiment, the interference detector 130 is configured to detect interference and which part of the message that is affected by the interference based on evaluation of Signal-to-Interference Ratio (SIR) or Signal-to-Interference-plus-Noise Ratio (SINR) measurements.

Figure 6B:
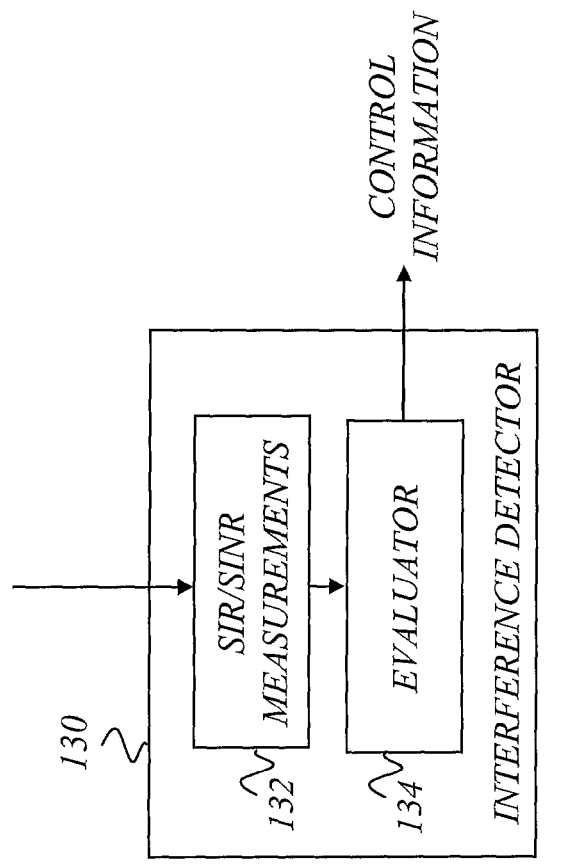
FIG. 6B is a schematic block diagram of an example of an interference detector according to an embodiment.
Figure 6A:
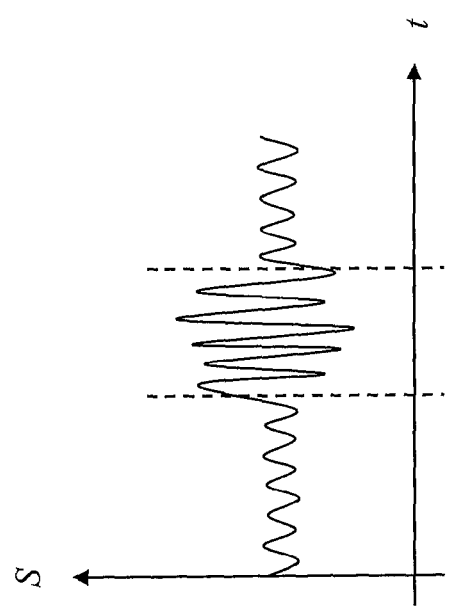
FIG. 6A is a schematic signal diagram illustrating an example of a period of relatively higher interference in a received signal at a relay node.

For example, the interference detector may be configured to detect a period of relatively higher interference in the received signal, as illustrated in FIG. 6A.

FIG. 6B is a schematic block diagram of an example of an interference detector according to an embodiment. In this particular example, the interference detector 130 comprises a unit 132 configured to perform SIR/SINR measurements, and a corresponding evaluator 134. The evaluator 134 uses the SIR/SINR measurements as input, and evaluates these measurements to detect a period of relatively higher interference in the received signal. The detected period corresponds to the part of the message that is affected by interference, and accordingly the evaluator 134 generates control information representative of which part of the message that is affected by the interference.

In another exemplary embodiment, the interference detector 130 is configured to detect interference and which part of said message that is affected by the interference based on evaluation of soft values. In general, a soft value represents the reliability of a received bit of information, and the statistical information value is normally a monotonous function of the absolute value of the soft value S. The soft value S for bit b is defined to be positive if it is more likely that b=0 than b=1, and negative otherwise. The higher the absolute value of the soft value, the higher is reliability of the bit.

Figure 7:
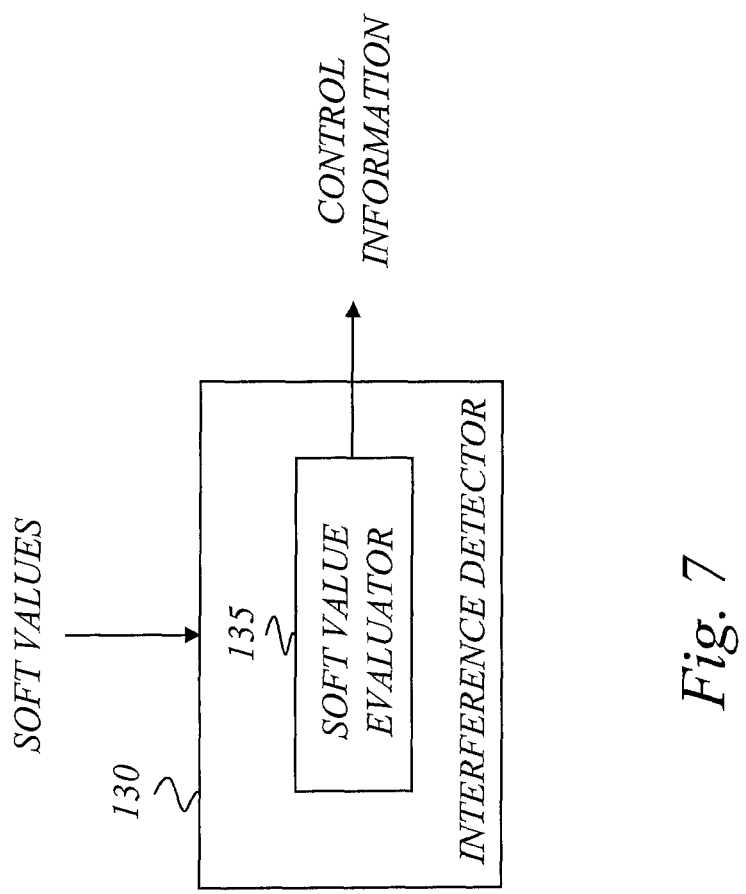
FIG. 7 is a schematic block diagram of an example of an interference detector according to an alternative embodiment.

FIG. 7 is a schematic block diagram of an example of an interference detector according to an alternative embodiment. The interference detector 130 of FIG. 7 is based on a soft value evaluator 135, which analyses soft values S from the demodulator (e.g. from the soft demapper) to detect interference and which part of the message that is affected. In general, the interference affects the transmission of information over the wireless medium and the amount of information that can be extracted at the receiving side depends on the level of interference experienced in time and/or frequency. By analyzing soft values and identifying areas of the signal in time and/or frequency (See FIG. 3) having different statistical behaviors with respect to the absolute values of S, it is possible to detect which part of the message that is substantially affected by the interference. With reference to FIG. 3, it is desirable to find the (dashed) area or areas which correspond(s) to higher interference based on statistical analysis of absolute values of S. Accordingly the soft value evaluator 135 can generate control information representative of which part of the message that is affected by interference by evaluating absolute values of S.

As previously indicated, the forwarding may for example be based on Amplify-and-Forward (AF) and/or Decode-and-Forward (DF) relaying.

Figure 8:
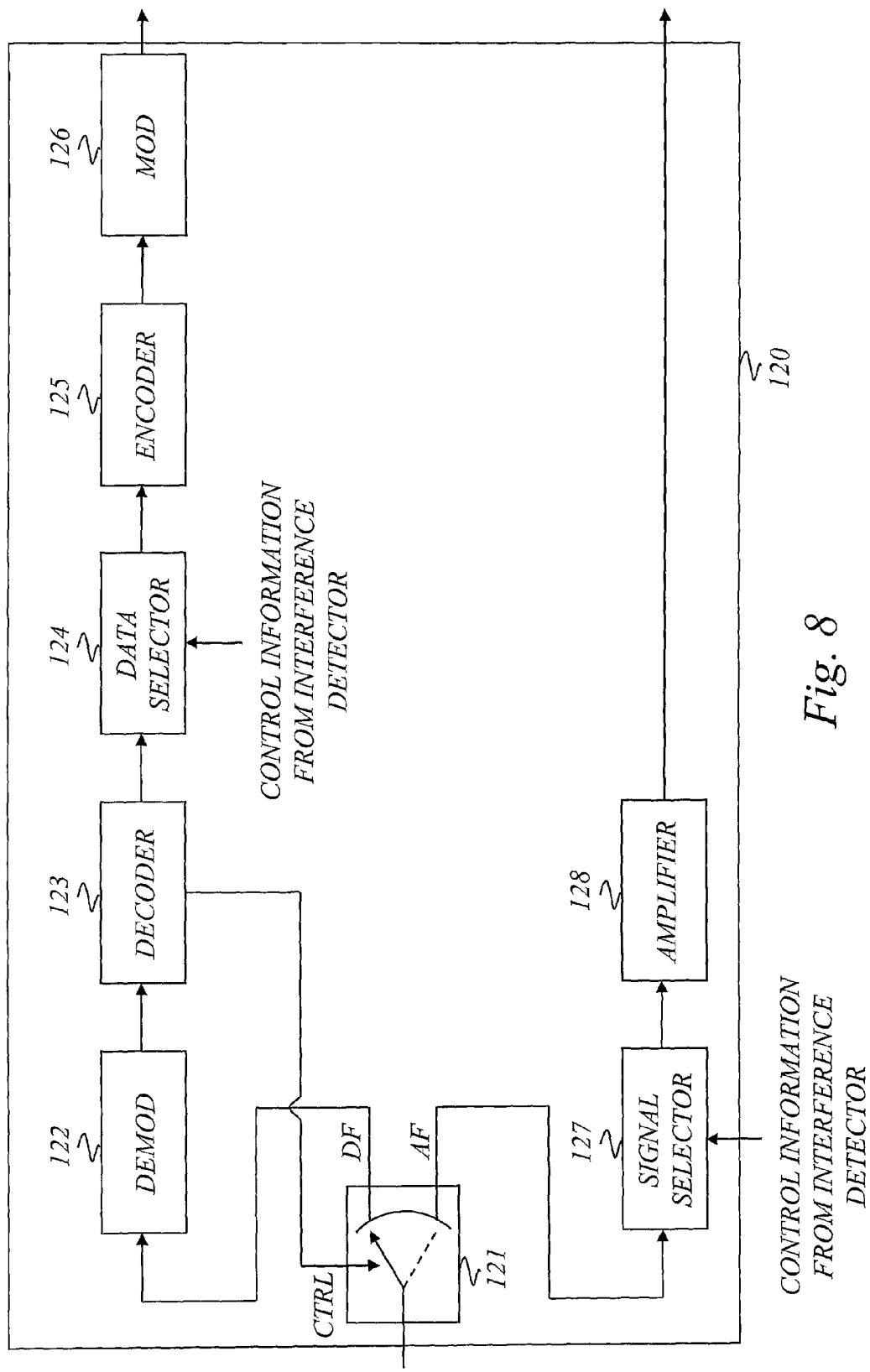
FIG. 8 is a schematic block diagram illustrating an example of a hybrid AF/DF unit according to an embodiment.

FIG. 8 is a schematic block diagram illustrating an example of a hybrid AF/DF forwarding unit according to an embodiment. The hybrid Amplify-and-Forward (AF) and Decode-and-Forward (DF) unit 120 basically comprises a switch 121, a demodulator (DEMOD) 122, a decoder 123, a data selector 124, an encoder 125, a modulator (MOD) 126, a signal selector 127 and an amplifier 128.

The switch 121 of the hybrid AF/DF forwarding unit 120 may be controlled to selectively send the received signal to the Decode-and-Forward (DF) path or to the Amplify-and-Forward (AF) path.

According to the hybrid AF/DF protocol, the switch 121 is normally first set up to send the received signal to the DF path.

If demodulation in the demodulator 122 and decoding in the decoder 123 is successful, re-transmission of the interfered part of the message will be performed.

The data selector 124 is configured to select a limited set of signal information (data) for transmission to the destination node based on control information from the interference detector 130 representative of which part of the message that is affected by the interference. This limited set of data corresponds to the interfered part of the message. The encoder 125 encodes the data and the modulator 126 then modulates the encoded data before transmission.

If demodulation in the demodulator 122 and decoding in the decoder 123 is not successful, a control signal is sent to the switch 121 so that the received signal can be sent to the AF path.

The signal selector 127 is configured to select a limited set of signal information for transmission to the destination node based on control information from the interference detector 130 representative of which part of the message that is affected by the interference. The interfered part of the message is then amplified in the amplifier 128 before transmission.

The relay node supports efficient relaying in the wireless communication network. The relay node will thus form part of a communication system including the originating source node, the relay node and a destination node for accomplishing relay-assisted overall transmission from the source node to the destination node.

Figure 9:
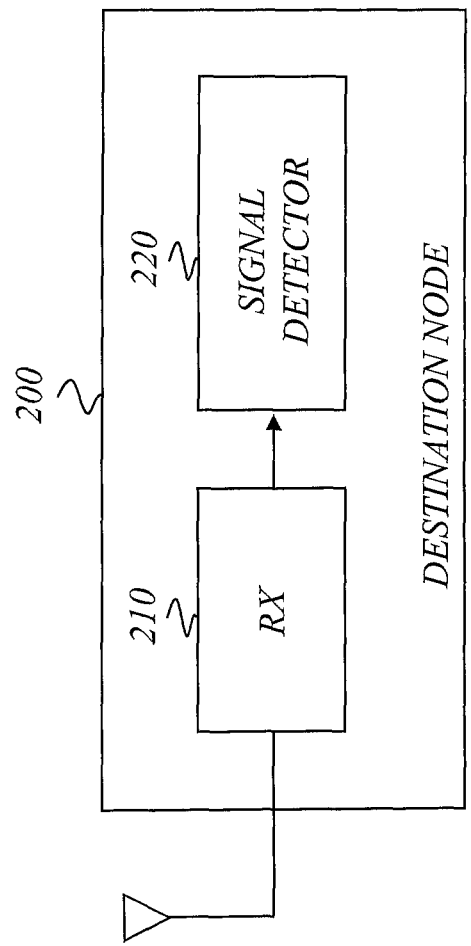
FIG. 9 is a schematic block diagram illustrating an example of a destination node according to an embodiment.

FIG. 9 is a schematic block diagram illustrating an example of a destination node according to an embodiment. The destination node 200 comprises a receiver 210 configured to receive a signal representative of a message from an originating node, wherein a transmission from an interference source causes interference in the received signal. The receiver 210 in the destination node is also configured to receive a signal representative of an interfered part of the message from a relay node. The destination node also comprises a signal detector 220 configured to detect at least part of the message based on combining a representation of the received signal from the originating node and a representation of the received signal from the relay node.

In an exemplary embodiment, the signal detector 220 is configured to combine the received signal representative of the message transmitted from the originating node and the received signal representative of the interfered part of the message transmitted from the relay node.

Figure 10:
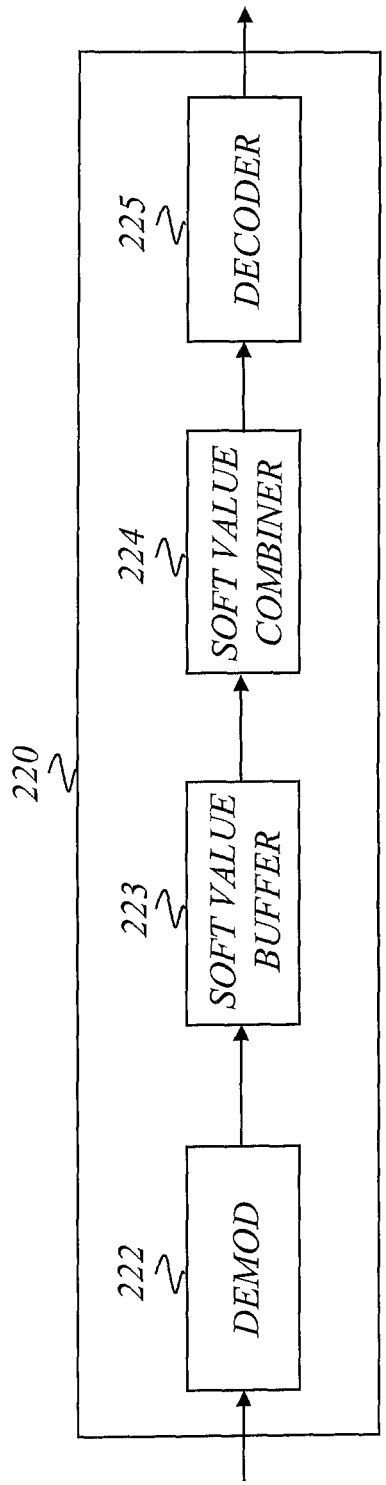
FIG. 10 is a schematic block diagram illustrating an example of a signal detector in a destination node according to an embodiment.

FIG. 10 is a schematic block diagram illustrating an example of a signal detector in a destination node according to another exemplary embodiment. In this embodiment, the detector 220 operates based on soft value representations of the received signals. In this particular example, the overall signal detector 220 comprises a demodulator (DEMOD) 222 that generates soft values, a soft value buffer 223, a soft value combiner 224 and a decoder 225.

Soft values from the demodulator 222 are buffered in the soft value buffer 223, and buffered soft values from the buffer 223 are transferred at suitable times to the soft value combiner 224. The soft value combiner 224 is configured to combine soft value representations of the received signal representative of the message from the originating node and the received signal representative of the interfered part of the message from the relay node, and the combined soft value representations are then used by the decoder 225 to decode the message or at least part of the message.

For a better understanding, a specific example will now be described with reference to the signal diagrams of FIGS. 11-20.

It is here assumed that the interference received by the relay node R and the destination node D are correlated, and that R can detect the interference which is also received by D. R selectively retransmits the interfered part of the whole message regardless of whether it decodes the message successfully or not. D can then combine the 1$^{st}$ time phase transmission and 2$^{nd}$ time phase transmission.

The relay R is able to detect which part of the message that is affected by the interference.

In a first exemplary case, the relay R can decode the message successfully, and then R re-encodes and selectively retransmits the interfered partial of the whole message.

In a second exemplary case, the relay R fails to decode the message, and then R selectively amplifies and forwards the interfered partial of the whole message.

Consider the partial retransmission of the interfered part of the whole packet in the presence of partial-time interference as an illustrative example.

Figure 11:
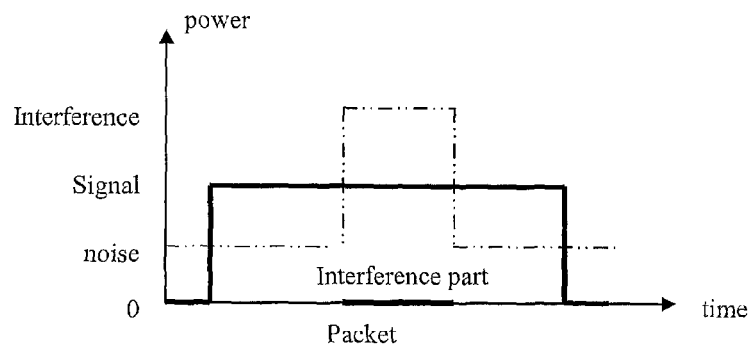
FIGS. 11-20 are signal diagrams according to an exemplary embodiment.
Figure 12:
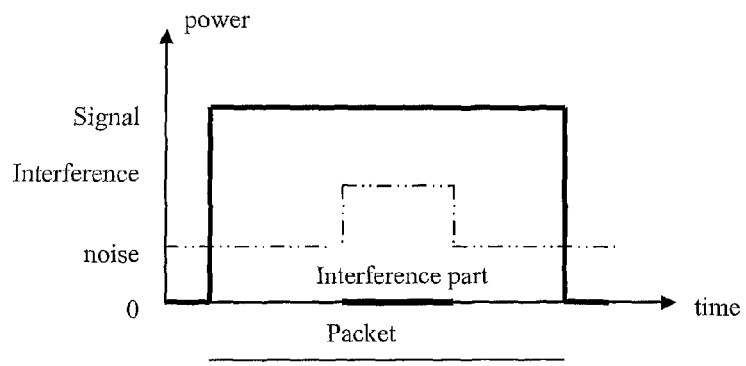

FIGS. 11 and 12 present an example of the signal, noise and interference experienced in the 1$^{st}$ time phase by nodes D and R, respectively. The received signal corresponds to a packet representing the message. In this example, the signal level is higher in the relay R than in the destination D as can be seen from FIGS. 11 and 12. This primarily has to do with the distance from the originating source node S. It is normally envisaged that the relay R is situated closer to the source node, as can be seen in FIG. 1. In this example, it can also be seen that the interference is lower in the relay R than in the destination D. This is related to the distance from the interference source I. As can be seen in FIG. 1, the relay R is situated farther away from the interference source I compared to the destination D, which is situated closer to the interference source I.

Figure 13:
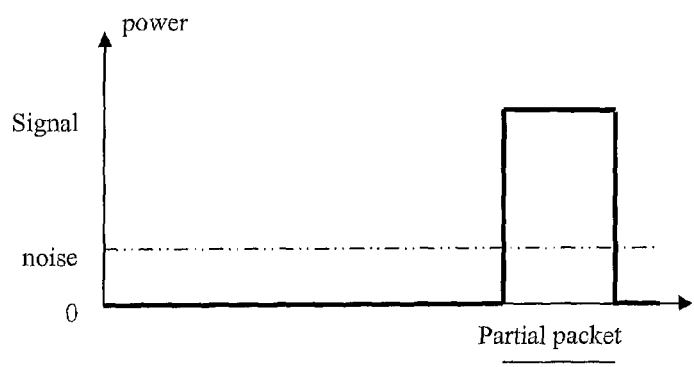

FIG. 13 presents an example of the signal and noise experienced by node D in the 2$^{nd}$ time phase, when the signal representative of the partial packet from the relay node R is received.

Figure 14:
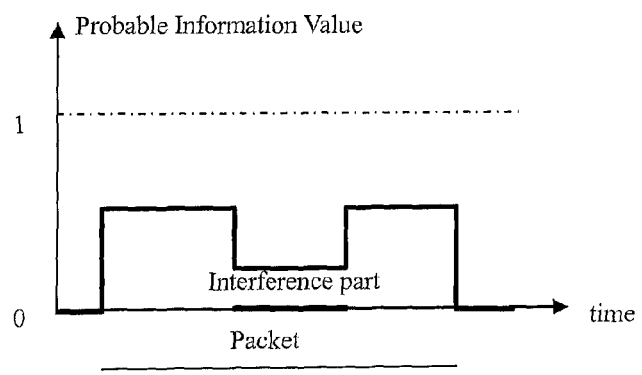
Figure 15:
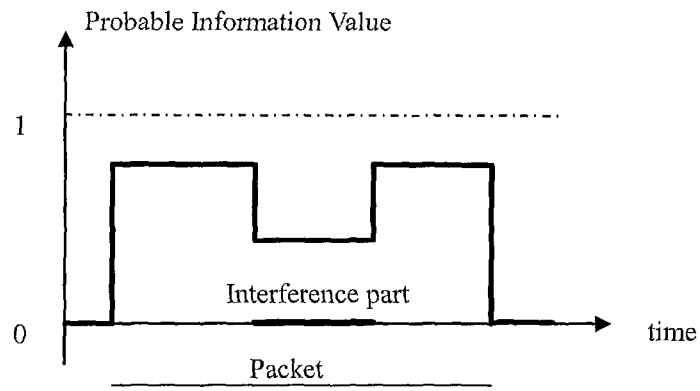

FIGS. 14 and 15 show a probable information value per bit received in the 1$^{st}$ time phase by nodes D and R, respectively. It is normally not possible to state with 100% certainty that the information is correct. The probable information value reflects the probability of the information being correct.

The probable information value is lower in the destination D than in the relay R, because of the signal-to-interference-plus-noise ratio situation previously discussed.

Figure 16:
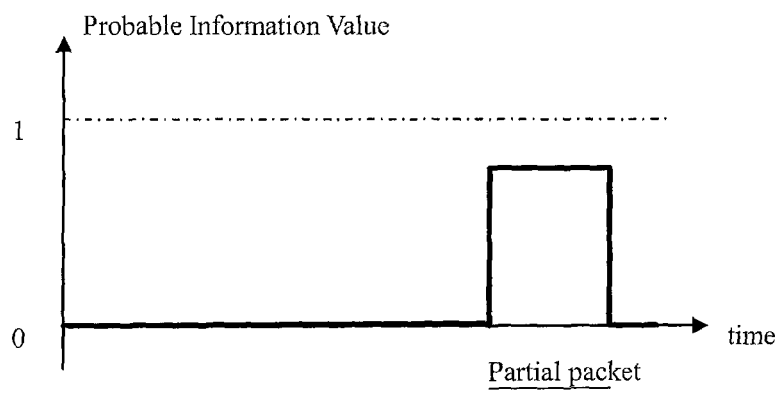
Figure 17:
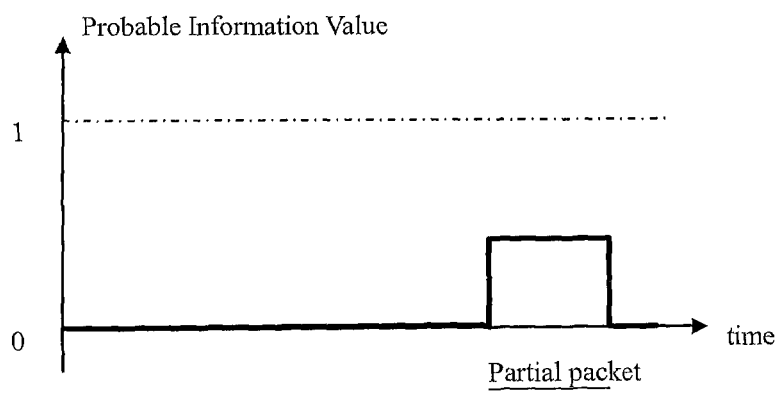

FIGS. 16 and 17 show a probable information value per bit received by D in the 2$^{nd}$ time phase, when using a DF relay scheme and an AF relay scheme, respectively. The probable information value is generally higher when using the DF scheme, because with the AF scheme the disturbances from the first transmission are amplified together with the signal information. This is generally not the case when the signal is first decoded and then forwarded.

Figure 18:
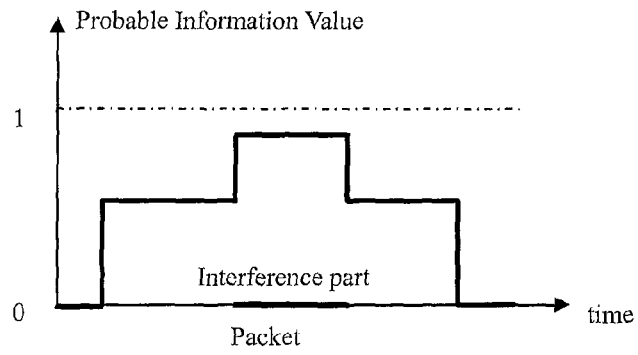

FIG. 18 shows the probable information value in D after combining the signal information received in the 1$^{st}$ time phase and the 2$^{nd}$ time phase, when the relay uses a DF scheme. Compared to the situation shown in FIG. 14, it is absolutely clear that the probable information value is better after combining is employed.

Figure 19:
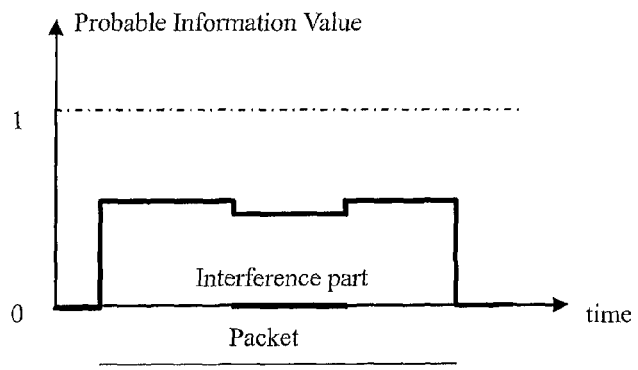

FIG. 19 shows the probable information value in D after combining the signal information received in the 1$^{st}$ time phase and the 2$^{nd}$ time phase, when the relay uses an AF scheme. Also with the AF scheme, the situation is better after combining.

Figure 20:
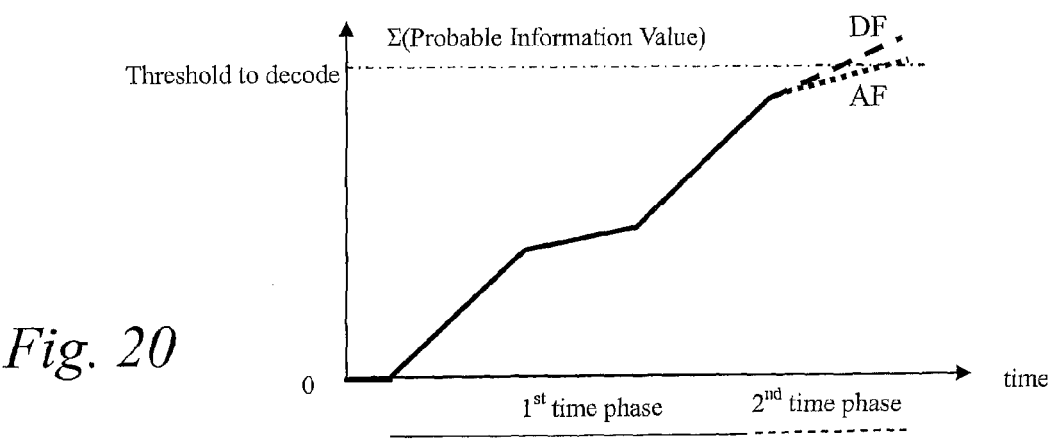

FIG. 20 illustrates the integral of the probable information value in node D over the 1$^{st}$ and 2$^{nd}$ time phases. After combining the signal information received in both time phases, the accumulated probable information value exceeds the threshold required for successful decoding. It can be seen that the contribution to the integral of the probable information value in the second time phase has a steeper inclination for the DF scheme compared to the AF scheme.

In practice, this means that the spectral efficiency can be improved and the delay can be minimized.

The functional blocks described above may be implemented in hardware using any conventional hardware technology such as Integrated Circuit (IC) technology. Alternatively, at least some of the functional blocks may be implemented in software for execution on suitable processing hardware such as a microprocessor or digital signal processor.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] M. R. Souryal and B. R. Vojcic, "Performance Of Amplify-And-Forward And Decode-And-Forward Relaying In Rayleigh Fading With Turbo Codes", 2006 IEEE International Conference on, May 2006.
[2] J. Moon; J. M. Shea and T. F. Wong, "Collaborative mitigation of partial-time jamming on nonfading channels", Wireless Communications, IEEE Transactions on Volume 5, Issue 6, June 2006.
[3] M. Han, S. Lee and S. Ro, "Cooperative diversity performance for OFDM transmission over partially jammed channels", AEU—International Journal of Electronics and Communications Volume 62, Issue 6, 2 Jun. 2008.
[4] WO 2007/064249 A1
[5] WO 2004/102891 A1
[6] US 2003/0223354A1

The invention claimed is:

1. A method for communication based on relaying in a wireless communication network having a number of network nodes, said communication network including a designated originating node, a relay node and a destination node, and said method comprising:
said originating node transmitting a message intended for said destination node;
said relay node receiving a first signal representative of said message transmitted from said originating node, wherein a transmission from an interference source causes interference in the received first signal;
said destination node receiving a second signal representative of said message transmitted from said originating node, wherein said transmission from said interference source causes interference in the received second signal;
said relay node detecting interference from said interference source in the received first signal and which part of said message is affected by the interference, called the interfered part of the message;
said relay node performing a partial retransmission based on the interfered part of the message;
said destination node receiving a third signal representative of the interfered part of the message transmitted from said relay node; and
said destination node detecting at least part of said message based on the received second signal representative of said message transmitted from said originating node and the received third signal representative of the interfered part of the message transmitted from said relay node.

2. The method of claim 1, wherein the relay node detects the interference from the interference source in the received first signal and detects which part of the message is affected by the interference, based on detecting the interference in at least one of the time domain and the frequency domain.

3. The method of claim 1, wherein the relay node detects the interference from the interference source in the received first signal and detects which part of the message is affected by the interference, based on Signal-to-Interference Ratio (SIR) or Signal-to-Interference-plus-Noise Ratio (SINR) measurements.

4. The method of claim 1, wherein the relay node detects the interference from the interference source in the received first signal and detects which part of the message is affected by the interference, based on evaluating soft values, each soft value representing the reliability of a received bit of information.

5. The method of claim 1, wherein performing the partial retransmission is based on Amplify-and-Forward (AF) relaying.

6. The method of claim 1, wherein performing the partial retransmission is based on Decode-and-Forward (DF) relaying.

7. A relay node configured for operation in a wireless communication network, said relay node comprising:
a receiver configured to receive a signal representative of a message transmitted from an originating node and intended for a destination node, wherein a transmission from an interference source causes interference in the received signal;
an interference detector configured to detect interference from said interference source in the received signal and which part of said message is affected by the interference, called the interfered part of the message; and
a forwarding unit configured to perform a partial retransmission to said destination node, based on the interfered part of the message.

8. The relay node of claim 7, wherein the interference detector is configured to detect the interference in the received signal and which part of the message is affected by the interference, in at least one of the time domain and the frequency domain.

9. The relay node of claim 7, wherein the interference detector is configured to detect the interference in the received signal and which part of the message is affected by the interference, based on evaluation of Signal-to-Interference Ratio (SIR) or Signal-to-Interference-plus-Noise Ratio (SINR) measurements.

10. The relay node of claim 7, wherein said interference detector is configured to detect the interference in the received signal and which part of the message is affected by the interference, based on evaluation of soft values, each soft value representing the reliability of a received bit of information.

11. The relay node of claim 7, wherein said forwarding unit includes a selector configured to select a limited set of signal information for transmission to said destination node, based on control information from the interference detector that is representative of which part of the message is affected by the interference.

12. The relay node of claim 7, wherein the forwarding unit is configured to perform a partial retransmission based on Amplify-and-Forward (AF) relaying.

13. The relay node of claim 7, wherein the forwarding unit is configured to perform a partial retransmission based on Decode-and-Forward (DF) relaying.

14. A destination node configured for operation in a wireless communication network, said destination node comprising:

a receiver configured to receive a signal representative of a message from an originating node, wherein a transmission from an interference source causes interference in the received signal, wherein said receiver is configured to also receive a signal representative of an interfered part of the message from a relay node; and a signal detector configured to detect at least part of said message based on combining a representation of the received signal from said originating node and a representation of the received signal from said relay node.

* * * * *